(12) United States Patent
Hartman et al.

(10) Patent No.: US 11,511,479 B2
(45) Date of Patent: Nov. 29, 2022

(54) TEMPERATURE CONTROL IN 3D OBJECT FORMATION

(71) Applicant: HEWLETT-PACKARD DEVELOPMENT COMPANY, L.P., Houston, TX (US)

(72) Inventors: Aja Hartman, Palo Alto, CA (US); Adekunle Olubummo, Palo Alto, CA (US); Kristopher J. Erickson, Palo Alto, CA (US); Lihua Zhao, Palo Alto, CA (US); Howard S. Tom, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 833 days.

(21) Appl. No.: 16/076,369

(22) PCT Filed: Jul. 10, 2017

(86) PCT No.: PCT/US2017/041370
§ 371 (c)(1),
(2) Date: Aug. 8, 2018

(87) PCT Pub. No.: WO2019/013751
PCT Pub. Date: Jan. 17, 2019

(65) Prior Publication Data
US 2021/0178658 A1 Jun. 17, 2021

(51) Int. Cl.
*B29C 64/393* (2017.01)
*B29C 64/112* (2017.01)
(Continued)

(52) U.S. Cl.
CPC .......... *B29C 64/112* (2017.08); *B29C 64/165* (2017.08); *B29C 64/205* (2017.08);
(Continued)

(58) Field of Classification Search
CPC ................. B29C 64/165; B29C 64/112; B29C 64/386–393; B29C 64/264; B29C 64/277–282; B29C 64/291
See application file for complete search history.

(56) References Cited

U.S. PATENT DOCUMENTS

| 6,189,993 B1 | 2/2001 | Mantell |
| 7,971,951 B2 | 7/2011 | Uji et al. |

(Continued)

FOREIGN PATENT DOCUMENTS

| CN | 105916663 | 8/2016 |
| FR | 2878771 | 6/2006 |

(Continued)

OTHER PUBLICATIONS

Vidimce et al., "Foundry: Hierarchical Material Design for Multi-Material Fabrication", Proceedings of the 29th Annual Symposium on User Interface Software and Technology, Retrieved from Internet: http://dl.acm.org/citation.cfm?id=2984516, 2016, pp. 563-574.

*Primary Examiner* — Matthew J Daniels
*Assistant Examiner* — Andrew L Swanson
(74) *Attorney, Agent, or Firm* — Dicke Billig & Czaja PLLC

(57) ABSTRACT

A device includes a carriage movable relative to a build pad along a bi-directional travel path and supporting at least a radiation source and an applicator to selectively apply a plurality of fluid agents, including first fluid agents to affect a first material property. A timing and order of operation of the radiation source and the applicator, with the carriage, is to maintain first and second portions of a 3D object under formation within at least one selectable temperature range despite a first total volume of the first fluid agents for application onto the first portion of the 3D object being substantially greater than a second total volume of second fluid agents for application onto the second portion of the 3D object.

17 Claims, 5 Drawing Sheets

(51) Int. Cl.
   *B29C 64/165* (2017.01)
   *B29C 64/205* (2017.01)
   *B33Y 10/00* (2015.01)
   *B33Y 30/00* (2015.01)
   *B33Y 50/02* (2015.01)

(52) U.S. Cl.
   CPC .............. *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 8,075,129 B2 | 12/2011 | Kohne et al. | |
| 2007/0238056 A1* | 10/2007 | Baumann | B33Y 10/00 |
| | | | 430/325 |
| 2007/0241482 A1* | 10/2007 | Giller | B29C 64/165 |
| | | | 264/494 |
| 2016/0145455 A1* | 5/2016 | Otake | C08B 3/14 |
| | | | 106/200.2 |
| 2017/0120338 A1 | 5/2017 | Goeing et al. | |
| 2017/0252974 A1* | 9/2017 | Ng | B22F 10/10 |

FOREIGN PATENT DOCUMENTS

| | | | |
|---|---|---|---|
| WO | 2015106816 A1 | 7/2015 | |
| WO | WO-2015108550 A1 * | 7/2015 | ............. B29C 64/00 |
| WO | 2015136277 A1 | 9/2015 | |
| WO | WO-2016050319 | 4/2016 | |
| WO | 2016068899 A1 | 5/2016 | |
| WO | WO-2016068899 | 5/2016 | |
| WO | WO-2016080993 A1 * | 5/2016 | ............. B33Y 10/00 |
| WO | 2016169617 A1 | 10/2016 | |

\* cited by examiner

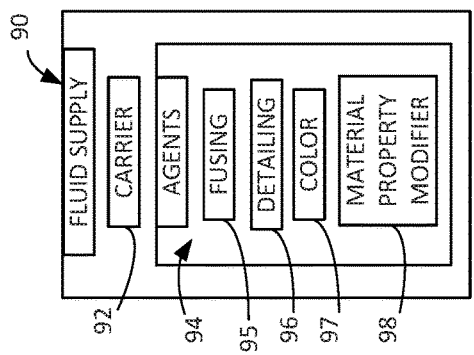
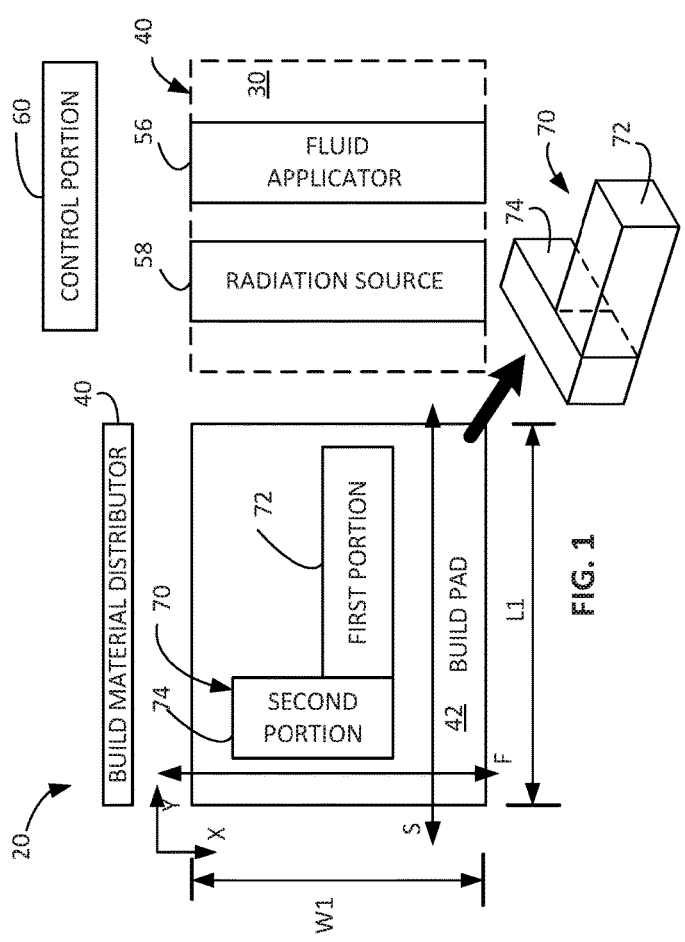
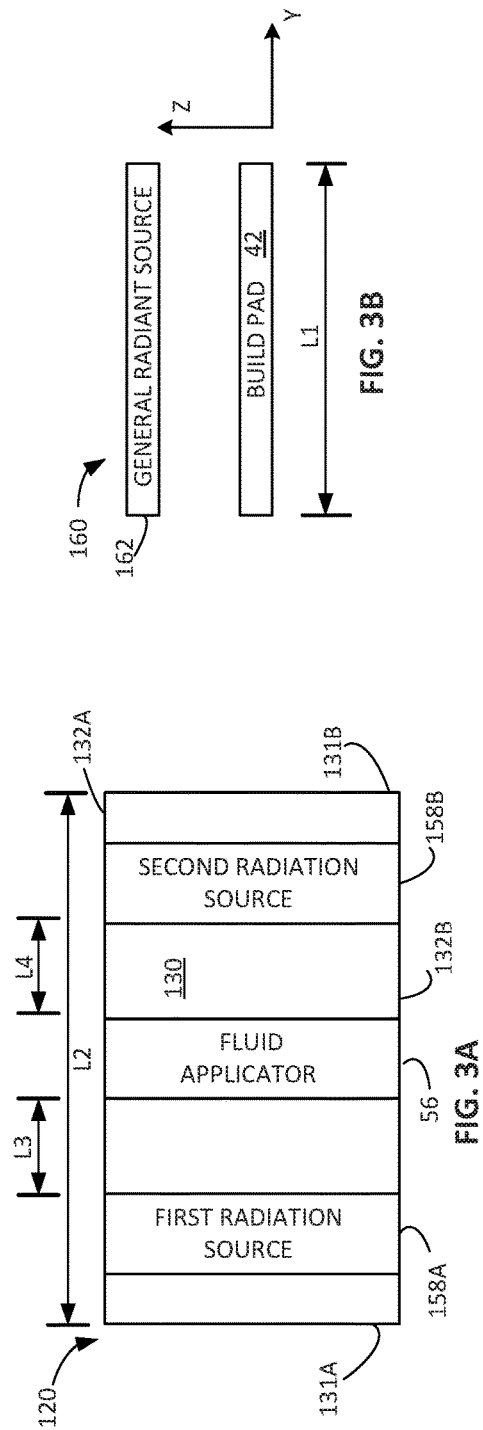

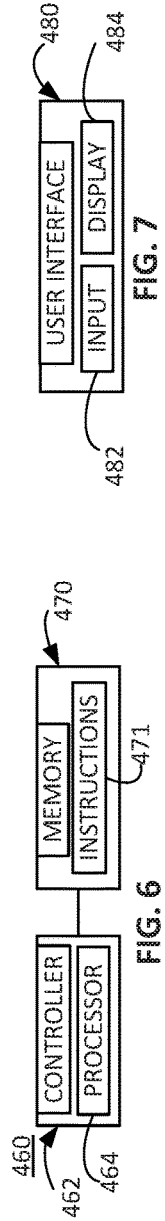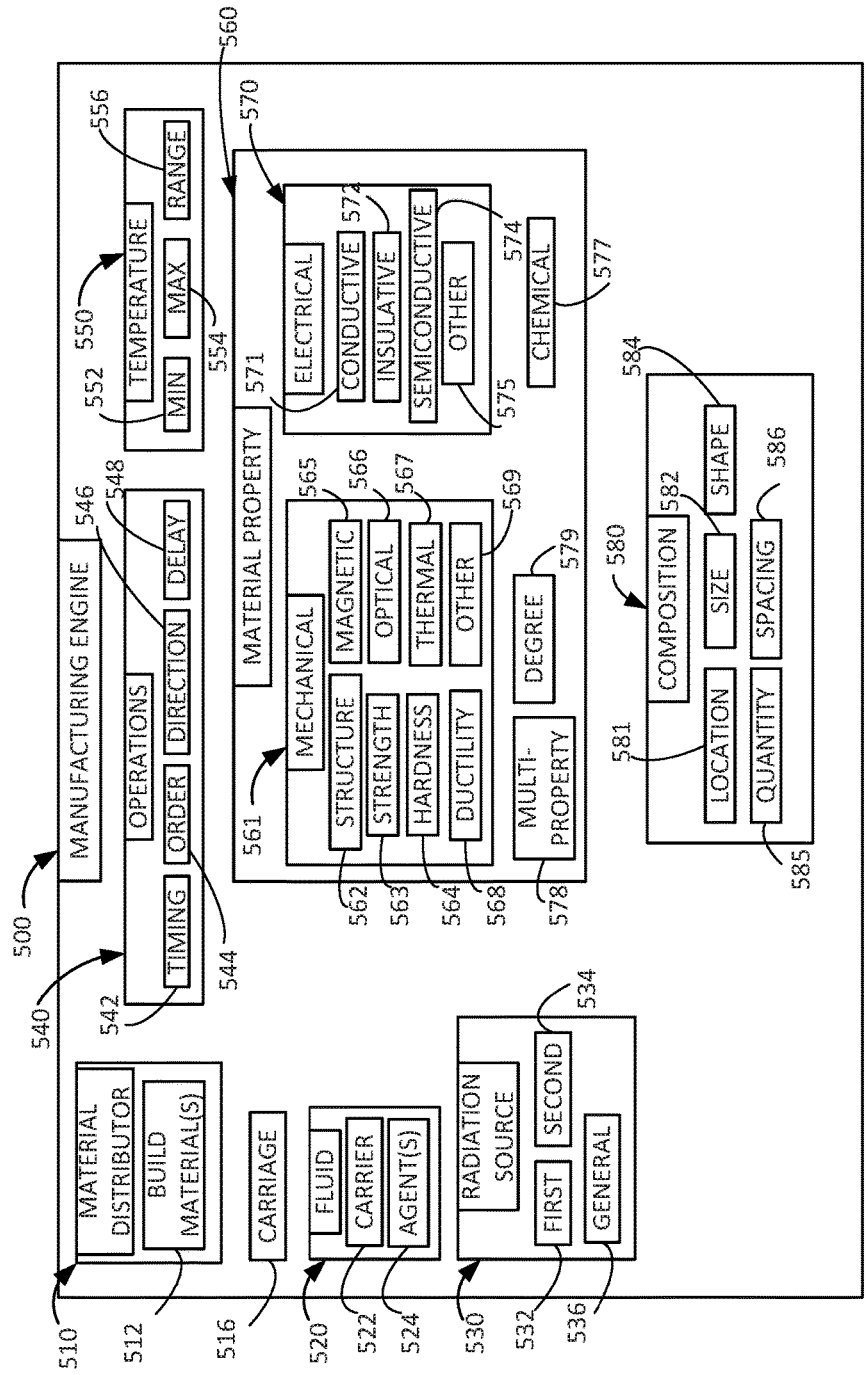

TEMPERATURE CONTROL IN 3D OBJECT FORMATION

BACKGROUND

Additive manufacturing may revolutionize design and manufacturing in producing three-dimensional (3D) objects. Some forms of additive manufacturing may sometimes be referred to as 3D printing. Some additively manufactured 3D objects may have functional and/or aesthetic characteristics.

BRIEF DESCRIPTION OF THE DRAWINGS

FIG. 1 is a top plan view schematically representing an example device to manufacture 3D objects.

FIG. 2 is a block diagram schematically representing an example fluid supply.

FIG. 3A is a top plan view schematically representing an example printing assembly including a fluid applicator and first and second radiation sources.

FIG. 3B is a side plan view schematically representing an example general radiation source relative to a build pad.

FIGS. 6 and 7 each are a block diagram schematically representing an example control portion and an example user interface, respectively.

FIG. 8 is a block diagram schematically representing an example manufacturing engine.

DETAILED DESCRIPTION

Figure 4:
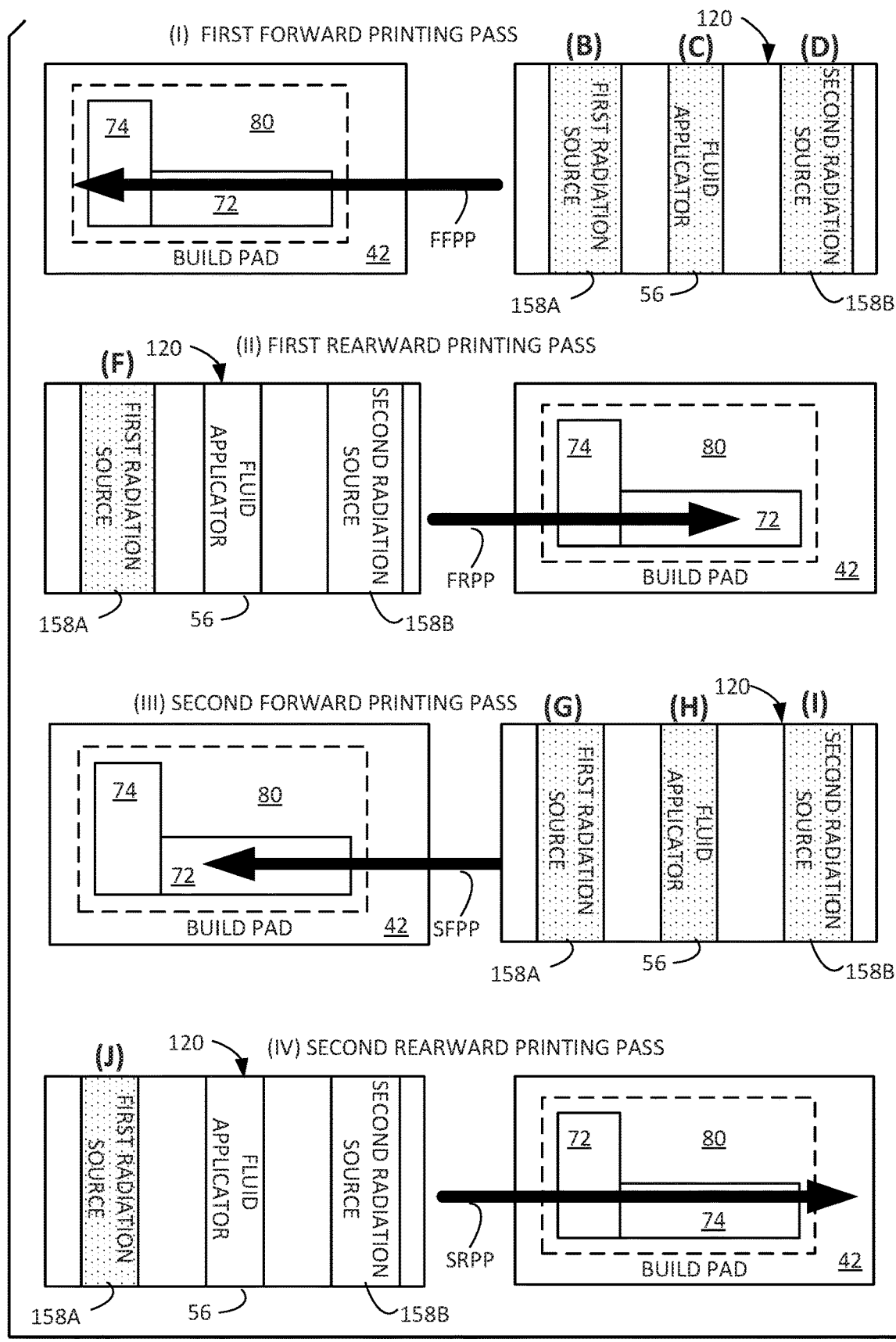
FIG. 4 is series of top plan views schematically representing an example printing assembly depicted in an example series of forward and rearward passes.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

At least some examples of the present disclosure may enhance maintaining a substantially uniform thermal profile of a 3D object under formation despite the application of significantly variable volumes of fluids to multiple different portions of the 3D object to implement different material properties for each respective different portion. Each multiple different portion of the 3D object comprises at least one voxel and typically comprises a group of voxels. Via maintaining a substantially uniform thermal profile, at least some example arrangements may minimize undesirable conditions (e.g. part warpage, poor fusing uniformity, dimensional inaccuracies, substandard mechanical performance, poor surface finish quality, etc.) which otherwise might occur under such significantly variable fluid loadings during 3D object formation.

In some examples, a device for manufacturing a 3D object (e.g. 3D printer) comprises a carriage movable relative to a build pad along a bi-directional travel path and supporting a radiation source and a fluid applicator. In some examples, a combination of at least the carriage, radiation source and fluid applicator may sometimes be referred to as a printing assembly.

The fluid applicator is to selectively apply a plurality of fluid agents, including a first fluid agent(s) to affect a first material property. In some examples, the first fluid agent(s) comprise a material property modifier agent and also may comprise a fusing agent.

A control portion may time and order operation of the radiation source and the applicator, in coordination with the carriage, to maintain first and second portions of a 3D object under formation within at least one selectable temperature range despite a first total volume of the first fluid agent (for application onto the first portion of the 3D object) being substantially greater than a second total volume of second fluid agents for application onto the second portion of the 3D object.

In some examples, the temperature range comprises a minimum temperature corresponding a melt temperature of the build material and a maximum temperature corresponding to an over-melt temperature of the build material. The over-melt temperature is a temperature above which the surrounding non-targeted build material may undesirably adhere to the 3D object under formation.

In some examples, the first material property comprises a material property different than an intrinsic material property (or properties) of the build material. However, in some examples the first material property comprises a material property the same as an intrinsic material property of the build material, which is selected to be significantly enhanced.

In some examples, the first material property comprises at least one of a plurality of material properties, at least some of which are mechanical properties. In some examples, the plurality of material properties may comprise a mechanical material property, an electrical material property, a chemical material property, etc. Accordingly, the first material property may comprise any one (or multiple) of material properties of a broad range of different material properties. In some examples, the first material property may comprise at least two different material properties. In each of these instances, a substantially greater volume of fluid agent is used to apply the particular material property modifying agent which exhibits the respective material property when applied to the build material.

In some examples, the second portion of the 3D object exhibits at least a second material property. In some examples, the second material property comprises an intrinsic property of the build material, such as a powder build material or other build material. In at least this context, the term "intrinsic" refers to those material properties of the build material prior to modification via a fluid agent applied via a fluid applicator in example manufacture of a 3D object. In some examples, the second material property may be created via application of second fluid agents to the build material.

In some examples, several separate "first" portions of a 3D object may exhibit the same first material property resulting from selective application of a first fluid agent(s). In some examples, at least two different material properties (each of which substantially differ from intrinsic material properties of the build material) may be implemented via application of respectively different "first" fluid agents applied at each of the respective different locations to exhibit the different material property. For instance, via such example arrangements, one "first" portion of the 3D object may exhibit a ductility substantially different than an intrinsic ductility of the build material while another "first" portion may exhibit a magnetism substantially different than an intrinsic magnetism of the build material.

Moreover, in some examples, a single "first" portion of the 3D object may exhibit at least two different material properties which are substantially different than corresponding different intrinsic material properties of the build material.

These examples, and additional examples, are described in association with FIGS. 1-9.

FIG. 1 is a diagram schematically representing an example device 20 to additively manufacture an example 3D object 70. In some examples, the device 20 comprises a build material distributor 50, a fluid applicator 56, and a radiation source 58. In some examples, a carriage 30 supports the fluid applicator 56 and radiation source 58, and is movable relative to a build pad 42. The carriage 30 is depicted in dashed lines to represent that the fluid applicator 56 and radiation source 58 may be arranged differently than shown in FIG. 1. For instance, in some examples as later shown in FIG. 3A, the fluid applicator 56 is interposed between two radiation sources 158A, 158B.

In some examples, the combination of the carriage 30, fluid applicator 56, and radiation source 58 may sometimes be referred to as a printing assembly 40 movable relative to the build pad 42.

In some examples, the device 20 comprises a control portion 60 to direct operation of the components (e.g. 30, 56, 58, 40) of the device 20 as described throughout the examples of the present disclosure. In some examples, control portion 60 may be implemented via at least some features of control portion 460 and/or manufacturing engine 500, as later described in association with FIGS. 6 and 8, respectively.

With further reference to FIG. 1, the build material distributor 50 is arranged to dispense a build material layer-by-layer onto a build pad 42 to at least partially additively form the 3D object 70. At least some aspects of such layer-by-layer construction are described and illustrated later in association with at least FIG. 5.

Once formed, the 3D object 70 may be separated from the build pad 42. It will be understood that a 3D object of any shape and any size can be manufactured, and the object 70 depicted in FIG. 1 provides just one example shape and size of a 3D object. In some instances device 20 may sometimes be referred to as a 3D printer. Accordingly, the build pad 42 may sometimes be referred to as a print bed or a receiving surface.

It will be understood that the build material distributor 50 may be implemented via a variety of electromechanical or mechanical mechanisms, such as doctor blades, slot dies, extruders, and/or other structures suitable to spread, deposit, and/or otherwise form a coating of the build material in a generally uniform layer relative to the build pad 42 or relative to a previously deposited layer of build material.

In some examples, the build material distributor 50 has a length (L1) at least generally matching an entire length (L1) of the build pad 42, such that the build material distributor 50 is capable of coating the entire build pad 42 with a layer of build material in a single pass as the build material distributor 50 travels the width (W1) of the build pad 42. In some examples, the build material distributor 50 can selectively deposit layers of material in lengths and patterns less than a full length of the build material distributor 50. In some examples, the build material distributor 50 may coat the build pad 42 with a layer of build material(s) using multiple passes instead of a single pass.

It will be further understood that a 3D object additively formed via device 20 may have a width and/or a length less than a width (W1) and/or length (L1) of the build pad 42.

In some examples, the build material distributor 50 moves in a first orientation (represented by directional arrow F) while the fluid applicator 56 moves in a second orientation (represented by directional arrow S) generally perpendicular to the first orientation. In some examples, the build material distributor 50 can deposit material in each pass of a back-and-forth travel path along the first orientation while the fluid applicator 56 can deposit fluid agents in each pass or just some passes of a back-and-forth travel path along the second orientation. In at least some examples, one pass is completed by the build material distributor 50, followed by a pass (or multiple passes) of the fluid applicator 56 before a second pass of the build material distributor 50 is initiated, and so on.

In some examples, the build material distributor 50 and the fluid applicator 56 can be arranged to move in the same orientation, either the first orientation (F) or the second orientation (S). In some such examples, the build material distributor 50 and the fluid applicator 56 may be supported and moved via a single carriage (e.g. 30 in FIG. 1; 130 in FIG. 3A) while in some such examples, the build material distributor 50 and fluid applicator 56 may be supported and moved via separate, independent carriages.

In some examples, the build material used to generally form the 3D object comprises a polymer material. In some examples, the polymer material comprises a polyamide material, such as but not limited to a PA12 material. However, a broad range of polymer materials may be employed as the build material. In some examples, the build material may comprise a ceramic material. In some examples, the build material comprises a powder material. In some examples, the build material may take a non-powder form, such as but not limited to liquid or filament. In at least some examples when the build material comprises a polymer material, the melting temperature of the polymer materials may be between about 75° C. and 400° C. However, various other types of build materials may each have a different range of melting temperatures.

Regardless of the particular form, at least some examples of the build material are suitable for spreading, depositing, extruding, flowing, etc. in a form to produce layers (via build material distributor 50) additively relative to build pad 42 and/or relative to previously formed first layers of the build material.

In some examples, prior to application of fluid agents via applicator 56, the build material does not significantly exhibit at least some of the mechanical, electrical, chemical properties, etc. to be added via fluid agents. However, as described throughout examples of the present disclosure, if desired, various different material properties may be infused (via the applicator 56) into the build material to at least some degree via fluid agents, such as a material property modifier agent (e.g. 98 in FIG. 2). Moreover, in some examples, one can select a build material which already incorporates at least some of these different material properties prior to employing the build material in forming the 3D object.

In some examples, the fluid applicator 56 shown in FIG. 1 comprises a printing mechanism, such as an array of printheads, each including a plurality of individually addressable nozzles for selectively ejecting fluid agents onto a layer of build material. Accordingly, in some examples, the fluid applicator 56 may sometimes be referred to as an addressable fluid ejection array. In some examples, the fluid applicator 56 may eject individual droplets having a volume on the order of ones of picoliters or on the order of ones of nanoliters.

In some examples, fluid applicator 56 comprises a thermal inkjet (TIJ) array. In some examples, fluid applicator 56 may comprise a piezoelectric inkjet (PIJ) array or other technologies such as aerosol jetting, anyone of which can precisely, selectively deposit a small volume of fluid. In some examples, fluid applicator 56 may comprise continuous inkjet technology.

In some examples, the fluid applicator 56 selectively dispenses droplets on a voxel-by-voxel basis. Accordingly, the fluid applicator 56 enables voxel-level control over the selective application of fluid agents, including but not limited to, the material property modifier agent 98. In one sense a voxel may be understood as a unit of volume in a three-dimensional space. In some examples, a resolution of 1200 voxels per inch in the x-y plane is implemented via fluid applicator 56. In some examples, a voxel may have a height (or thickness) of about 100 microns, although a height of the voxel may fall between about 80 microns and about 100 microns. However, in some examples, a height of a voxel may fall outside the range of about 80 to about 100 microns.

In some examples, the fluid applicator 56 has a width (W1) at least generally matching an entire width (W1) of the build pad 42, and therefore may sometimes be referred to as providing page-wide manufacturing (e.g. page wide printing). In such examples, via this arrangement the fluid applicator 56 can deposit fluid agents onto the entire receiving surface in a single pass as the fluid applicator 56 travels the length (L1) of the build pad 42. In some examples, the fluid applicator 56 may deposit fluid agents onto a given layer of material using multiple passes instead of a single pass.

In some examples, fluid applicator 56 may comprise, or be in fluid communication with, an array of reservoirs to contain various fluid agents. In some examples, the array of reservoirs may comprise an ink supply 90, as shown in FIG. 2. In some examples, at least some of the fluid agents 94 may comprise a fusing agent 95, detailing agent 96, etc. to enhance formation of each layer of build material. In particular, upon application onto the build material at selectable positions via the fluid applicator 56, the respective fusing agent and/or detailing agent may diffuse, saturate, and/or blend into the respective layer of the build material at the selectable positions.

However, in addition to such fusing agents, detailing agents, in some examples and as further described later throughout at least some examples of the present disclosure, the fluid applicator 56 may selectively deposit a material property modifier agent 98 (FIG. 2) as a fluid agent to influence a material property of the to-be-formed 3D object. A wide range of material properties may be implemented as a modification of the intrinsic material properties of the build material, at least some of which are described later in association with at least material property engine 560 in FIG. 8. For instance, among many potential modifications, one such modification may be to increase a ductility in one portion of the 3D object such that one portion has a ductility different than the intrinsic ductility of the build material. In such examples, the material property modifier agent 98 may comprise a plasticizer.

The selectable locations at which the material property would be modified may be a group of selectable locations (e.g. voxel locations), or multiple different groups of selectable locations 74 may be selected in any position, any size, any shape, and/or combination of shapes.

In some examples, the at least some selectable locations may comprise selectable locations corresponding to an entire component of a multi-component 3D object. In some examples, the at least some selected locations correspond to an entire region of a 3D object, such as but not limited to an end portion, middle, etc. such as first portion 72 in FIG. 1.

In some examples, in a single session a plurality of 3D objects are formed at one time including "first" 3D objects having a first material property caused via a material property modifier agent 98 (FIG. 2) and "second" 3D objects having a second material property. In one aspect, the "first" 3D object(s) are wholly independent of the "second" 3D objects. In some examples, the "first" 3D object(s) comprises the same shape and/or size as the "second" 3D object(s). However, in some examples, the "first" 3D object(s) may have a size and/or shape different than the "second" 3D object(s).

In some examples, applying a material property modifier agent 98 may involve applying a total volume of fluids that is substantially greater than a total volume of fluids applied for areas of the 3D object not subject to material property modification. In some such examples, the control portion 60 manages the timing and order of operation of the application of fluids (via fluid applicator 56) and/or the application of radiation (via radiation source 58) for fusing and/or evaporation in a manner to maintain a substantially uniform thermal distribution/profile among different portions of the 3D object despite the substantially different volumes of fluid being applied to those different portions. At least some examples regarding timing and order of operation of various elements (e.g. carriage, radiation source, fluid applicator) are further described below and later in association with at least FIGS. 4-5 and/or at least manufacturing engine 500 in FIG. 8. In some examples, the substantially uniform thermal distribution may sometimes be implemented via maintaining the multiple portions of a 3D object within a selectable temperature range despite the substantially different volumes of fluids (e.g. fluid agents) applied to the respectively different portions.

In some examples, the at least one selectable temperature range may refer to a plurality of selectable temperature ranges, at least some of which are described in more detail below in association with at least FIGS. 4-5.

In some examples, in at least this context the term "substantially greater" comprises at least one order of magnitude (or even at least two orders) difference between the first and second total volumes. In some examples, the term "substantially greater" comprises at least a 50% difference (at least 2×, 3×, etc. different) in the first total volume and the second total volume.

FIG. 2 is block diagram of an example fluid supply to supply fluid agents to the fluid applicator 56 for application relative to a layer of build material on build pad 42. As shown in FIG. 2, fluid supply 90 comprises reservoirs to hold various fluids, such as a carrier 92 (e.g. ink flux) by which various agents may be applied in a fluidic form. When combined into the carrier 92, the various agents may be referred to as fluid agents. Fluid supply 90 comprises an agent portion 94 to hold agents for application in association with the carrier 92 as fluid agents. In some examples, the agent portion 94 may hold fusing agent(s) 95, detailing agent(s) 96, color agent(s) 97, and a material property modifier agent 98. It will be understood that when a particular agent (e.g. fusing agent 95) is described as being applied via fluid applicator 56, the fusing agent is being applied in a fluidic form via carrier 92 even though carrier 92 is not explicitly mentioned. In some examples, an active agent(s), including a material property modifier agent 98, may comprise between 0.5 weight percent to about 60 weight percent of the total fluid volume of the first fluid agent. In some examples, the active agent, including a material property modifier agent 98, may comprise between about 10 weight percent and 50 weight percent of the total fluid volume of the first fluid agent. In some examples, the active agent, including a material property modifier agent 98, may comprise between about 20 weight percent and 30 weight percent of the total fluid volume of the first fluid agent.

In some examples, the first fluid agent, including a material modifier agent 98, may be dispensed between a 1 Contone Level to a 2040 Contone Level in a 3D object or portion of a 3D object. In some examples, the Contone Level may be between 50 and 1500. In some examples, the Contone Level may be between 100 and 1000. In some examples, the Contone Level may be between 150 and 500.

After selective application onto a layer of build material, the fusing agent 95 can cause fusing of the build material in response to radiation energy (such as via radiation source 58). As further described later in association with at least FIGS. 4-5, the fusing agent 95 enables the treated portion of build material to reach an elevated temperature exceeding the melting point of the build material. Via the selective application of the fusing agent 95 to areas intended to be fused, other non-treated portions of build material can remain below the melting temperature of the build material and therefore not form part of the 3D object.

It will be understood that at least some components (e.g. an absorber) of the fusing agent 95 may comprise a wavelength spectrum which is responsive to a particular wavelength spectrum emitted by the radiation source 58 such that the emitted radiation may selectively or preferentially radiate and heat those portions of the 3D object under formation. In some examples, the wavelength spectrum comprises infrared (IR) and/or near infrared (NIR) wavelengths. In some examples, the radiation source (e.g. 58, 158A, 158B) may comprise any suitable fusing lamp, such as infrared (IR) lamps, ultraviolet (UV) lamps, flash lamps, halogen lamps, microwave radiation, xenon pulse lamps, IR lasers, etc.

Radiation exposure may take place to preheat the build material, to fuse the build material in contact with the fusing agent 95, to evaporate excess fluids after deposit of the fluid agents onto the build material, etc. Depending, at least in part, on the amount of the fusing agent 95, detailing agent 96, material property modifier agent 98 deposited onto the build material, the absorbance of the radiation absorber, the preheat temperature, the radiation source power, and the melting or softening point of the build material, an appropriate amount of irradiation can be supplied from the radiation source 58. In addition, the speed of the carriage 30 and the size of the radiation sources (58, 158A, 158B) also may affect the irradiation time. In some examples, the radiation source (58, 158A, 158B) can irradiate each layer of build material from about 0.025 seconds (25 milliseconds) to about 1 second per heating event. This time range may be suitable, for example, when the carriage pass speed ranges from about 4 inches per second to about 40 inches per second and the radiation source 58 ranges from about 1 inch to about 4 inches in length. In some examples, the carriage speed may be 20-25 inches/second.

In some examples, the detailing agent 96 may be applied in some instances to affect a surface appearance or finish of a surface of the particular exposed layer of the build material forming the 3D object. In some examples, the detailing agent 96 may be used in some instances for thermal management, such as to help control a maximum temperature that the build material can reach. Accordingly, the particular composition of the detailing agent 96 may vary widely depending upon the purpose to which the detailing agent 96 is used, if at all.

The color agent 97 may be used in some instances to affect a color of the particular portion of the 3D object. Some examples of the color fluid agent 97 may act as, and/or in cooperation with, a fusing agent to influence absorbance of radiation to thereby influence fusing of the build material. As shown later in Table 1, more than one color may be represented by color agent 97 in FIG. 2 as in some examples, the fluid applicator 56 may comprise several different color channels (e.g. Cyan, Magenta, Yellow, Cosmetic Black (e.g. "Cosm" in Table 1). In some instances, the fusing agent 95 may its own channel (e.g. AFA in Table 1) and have a particular color such as black (e.g. carbon black) selected to facilitate absorption of radiation and thereby facilitating fusing.

In some examples, the material property modifier agent 98 modifies at least one material property of the portion of build material onto which it is applied. At least some examples of the various material properties which may be modified via application of fluid agents (e.g. modifier agent 98) are described later in association with at least FIG. 8 generally, and in particular in association with material property engine 560 in FIG. 8.

In some examples, application of the material property modifier agent 98 may involve a significantly greater volume of carrier fluid 92 than used to apply other fluid agents, such as fusing agent 95. In some examples, in order to achieve the desired material property modification via agent 98, the first total volume of first fluid agents (including carrier 92 and agents 95, 98 etc.) applied to a first portion (e.g. 72 in FIG. 1) may be substantially greater than a second total volume of second fluid agents applied in areas (e.g. second portion 74) of 3D object 70 which are not being modified by the material property modifier agent 98. In such cases, these non-modified areas (or slightly modified areas) may generally exhibit the intrinsic material properties of the build material.

One example of a material property modifier agent 98 includes employing a plasticizer as fluid agent to modify the ductility of a portion of a 3D object. In some such examples, application of the plasticizer may demand a relatively large volume of fluid carrier 92 and modifying agent 98 to achieve the desired ductility, and therefore thermal management may be implemented to ensure relative uniformity in the temperature ranges of the different portions of the 3D object under formation.

FIG. 3A is a top plan view schematically representing an example printing assembly 120, which may form a portion of a device for manufacturing a 3D object. The printing assembly 120 may comprise one example implementation of the printing assembly 40 in FIG. 1. As shown in FIG. 3A, printing assembly 120 comprises a carriage 130 which supports at least a first radiation source 158A and a second radiation source 158B, which is spaced apart from the first radiation source 158B on the carriage 130. The spacing extends generally parallel to the bi-directional travel path (e.g. directional arrow S in FIG. 1) of the carriage 130. Moreover, as further shown in FIG. 3A, in some examples the fluid applicator 56 is interposed between, and spaced apart from, the respective first and second radiation sources 158A, 158B. In some examples, carriage 130 has a length L2, the first radiation source 158A is spaced apart from the fluid applicator 56 by a distance L3, and the second radiation source 158B is spaced apart from the fluid applicator 56 by a distance L4. The distances L2, L3, L4 are selectable to facilitate timing of operation of the respective fluid applicator 56 and radiation sources 158A, 158B to enable maintaining at least one selectable temperature range(s) among multiple different portions of a 3D object under formation, as further described herein.

FIG. 3B is side plan view schematically representing at least a portion of an example device including a general radiation source. As shown in FIG. 3B, in some examples a device 160 may comprise features and attributes like the radiation source 58 in device 20 (FIG. 1) or the radiation sources 158A, 158B and may also additionally comprise a general radiation source 162 extending above the build pad 42 and remaining in a fixed location (i.e. not movable with carriage 130 in FIG. 3A). The general radiation source 162 may be activated to facilitate evaporation of excess fluid from fluid agents after their application onto a layer of build material. In some instances, the general radiation source 162 may be activated concurrently with the one or both of radiation sources 158A, 158B (FIG. 3A) or in some instances, general radiation source 162 may be activated at times at which other radiation sources (e.g. 58, 158A, 158B) are inactive.

With these arrangements in mind, and with reference to FIGS. 4-5 and Tables 1 and 2, several examples will be described regarding application of fluid agents and/or of radiation to a layer of build material. In general terms, the fusing agent 95 and the material property modifier agent 98 are applied in a plurality of passes with several heating events being performed throughout the passes, and with the order of the passes and events being controlled to manage a thermal profile among different portions of the 3D object under formation. In particular, the application of fluid agents and/or the heating events are spread out throughout the printing passes to avoid over-heating and to manage thermal distribution in view of the large volume of fluid carrier (e.g. ink flux) involved in applying a sufficient amount of the modifier agent 98 relative to a small amount of other fluid agents applied to those portions of the build material not receiving the material property modifier agent 98.

Figure 5:
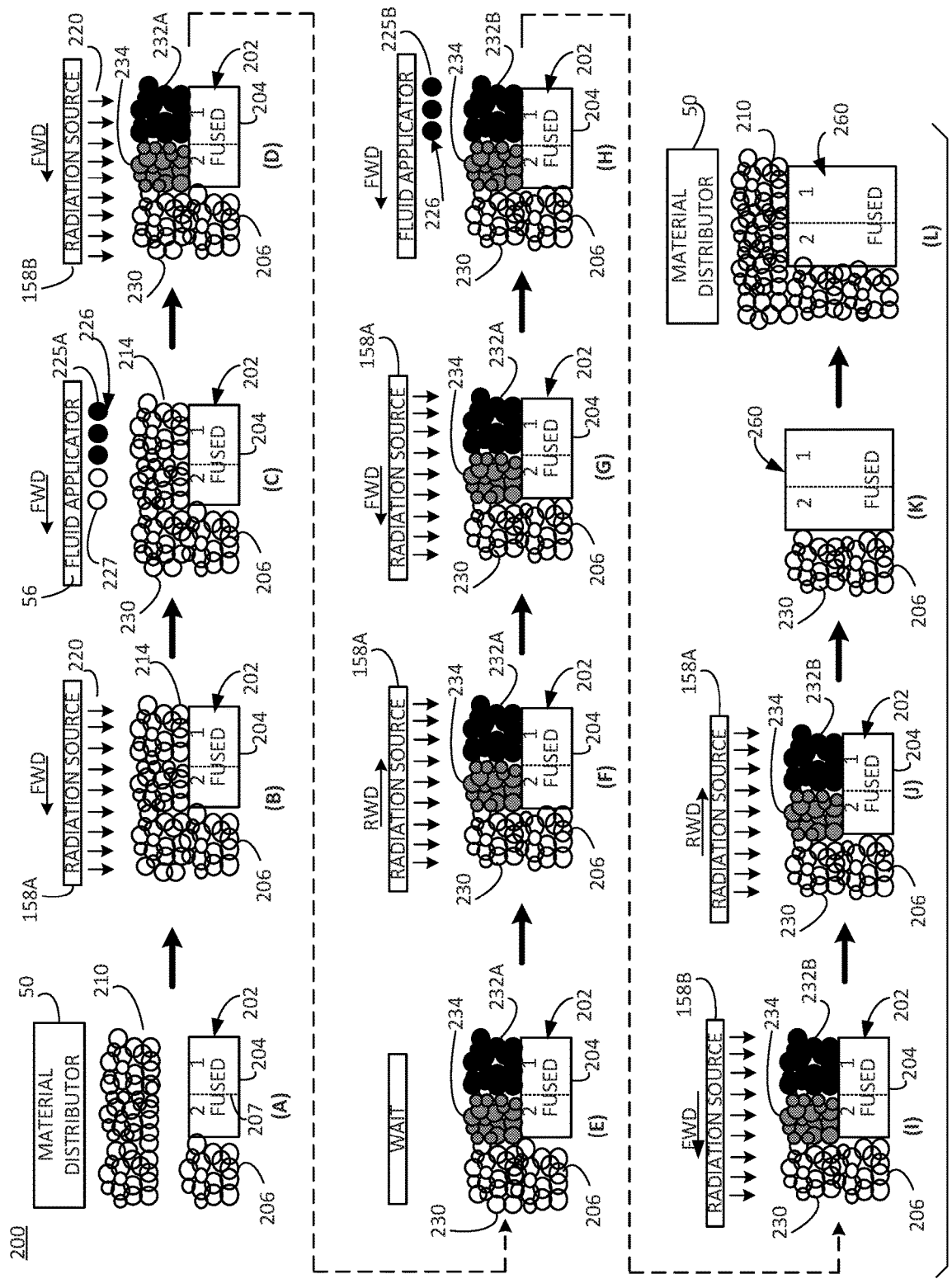
FIG. 5 is a series of side plan views schematically representing various example actions during manufacture of a 3D object.

It will be understood that some example implementations may utilize timing and/or order of operations of carriage 130, fluid applicator 56, and radiation sources 56, 158A, 158B other than depicted in Tables 1-2 and FIGS. 4-5 while still maintaining a substantially uniform thermal profile range for different portions (e.g. 72, 74 in FIG. 1) of a 3D object under formation despite a substantially different volume of fluid agents (including carrier 92) being applied in the respectively different portions (e.g. 72, 74) of a 3D object under formation.

FIG. 4 is series of top plan views schematically representing an example printing assembly depicted in an example series of forward and rearward passes in manufacturing a 3D object. FIG. 5 is a diagram 200 including a series of side plan views schematically representing various example actions (e.g. stages) during manufacture of a 3D object. Among other features, FIG. 4 includes alphabetic reference indicators (e.g. (B), (C) etc.) which correspond to indicators (e.g. B, C etc.) in FIG. 5, which indicate different actions (e.g. stages) of manufacturing a 3D object. Accordingly, FIGS. 4 and 5 will be discussed together.

Moreover, Tables 1 and 2 provide one example of a particular timing and order of fluid application, heating, etc. which corresponds to the actions depicted FIGS. 4-5.

Accordingly, Tables 1 and 2 will be referenced periodically during the description of FIGS. 4-5. It will be understood that a separate Table (like Table 1) may be used to represent fluid application for each respective separate portion (e.g. 72, 74) of a 3D object.

In each Table, the terms "Yes" and "No" indicate whether printing occurs via a particular channel (e.g. 1, 2, 3, 4, 5, 6, 7) during the respective identified printing pass (e.g. 1st Forward Printing Pass, 1st Rearward Printing Pass, etc.). In at least some examples, the term Contone Level refers to the number of drops, which is divided by 256, that will be placed on average onto each voxel. In one aspect, the Contone Level may be between 0 and 255, with 255 representing a maximum Contone Level (CL) to be applied for a particular channel (e.g. Channels 4 and 5 in this example). The maximum loading may vary depending on the print resolution, drop weight of the applicator 56, the concentration of the agent, the number of passes, the effective printing slots of the applicator 56, thickness of the build material layer (e.g. 230 in FIG. 5). Meanwhile, a "0" Contone Level in Table 1 indicates that no fluid agent (e.g. Yellow in Channel 1) is applied via fluid applicator 56.

TABLE 1

Printing Passes

|  | Channel number | | | | | | |
| --- | --- | --- | --- | --- | --- | --- | --- |
|  | 1 | 2 | 3 | 4 | 5 | 6 | 7 |
| Agent | Y | C | M | Modifier | Modifier | Cosm | AFA |
| Contone level $^a$ | 0 | 15 | 0 | 255 | 255 | 0 | 130 |
| 1$^{st}$ Forward Printing Pass | No | Yes | No | Yes | Yes | No | Yes |
| 1$^{st}$ Rearward Printing Pass | No | No | No | No | No | No | No |
| 2$^{nd}$ Forward Printing Pass | No | No | No | Yes | Yes | No | No |
| 2$^{nd}$ Rearward Printing Pass | No | No | No | No | No | No | No |

$^a$ Contone level is a parameter to control the ink/fluid density at the image area

TABLE 2

Heating events

|  | First Radiation Source | Second Radiation Source |
| --- | --- | --- |
| Heating Events with 1$^{st}$ Fwd Print Pass | Yes | Yes |
| Heating Events with 1$^{st}$ Rwd Print Pass | Yes | No |
| Heating Events with 2$^{nd}$ Fwd Print Pass | Yes | Yes |
| Heating Events with 2$^{nd}$ Rwd Print Pass | Yes | No |

As labeled as 1st Forward Printing Pass (FFPP) in Table 1 and as shown in frame I of FIG. 4, a first forward pass (FFPP) of printing assembly 120 (FIG. 3A) is made along a travel path over build pad 42.

Prior to initiation of this first forward printing pass (FFPP), the material distributor 50 (FIG. 1) coats a layer 210 of build material onto a previous layer 202 of a 3D object under formation, as shown in Frame A of FIG. 5. In some examples, previous layer 202 may comprise an unfused portion 206 and a fused portion 204, which in turn includes a first portion 1 (e.g. 72 in FIG. 1) and a second portion 2 (e.g. 74 in FIG. 1). Dashed line 207 represents a boundary between the respective first and second portions 1, 2. In some examples, the layer of build material deposited on the build pad may form a "footprint" area 80 (e.g. size and/or shape) larger than an area defined by to-be-formed 3D object 70, as shown in FIG. 4. In some examples, the depositing of initial layer(s) of a build material via the material distributor 50 without action by the fluid applicator and/or radiation source may sometimes be referred to as being a pre-pass activity to the extent that an initial pass of the carriage, fluid applicator, and radiation source is referred to as a first pass.

As further shown in stage B in FIG. 5 (e.g. Frame I in FIG. 4), during a first portion of a first forward printing pass (FFPP) prior to application of fluid agents, a radiation source (e.g. first radiation source 158A in FIG. 3A) applies radiation 220 to heat the deposited build material 214 to a first temperature range (prior to any application of fluid) having a minimum temperature and having a maximum temperature between 50° C. less than and at least 5° C. less than a melt temperature of the build material. In some examples, this first temperature range comprises a temperature between about 130° C. to about 170° C., such as when a melting temperature of the build material is about 175° C. This action is represented in Frame I of FIG. 4 by the shading of first radiation source 158A and the indicator B.

In at least some examples of stage B, a temperature of the deposited build material 214 is maintained below 175° C. to prevent melting of the build material in order to prevent caking of unwanted build material to the 3D object under formation. In some examples, the minimum temperature of the first temperature range is sufficient to at least partially "wet" the build material and/or cause some stickiness on a surface of the build material. In some examples, the wetting threshold comprises a temperature at which solid material (could be particles of a powder) begins to exhibit at least some stickiness without becoming liquid or fully melting.

In one aspect, this "wetted" or sticky build material may facilitate landing and/or absorption of fluid agents upon their application via applicator 56 as further described below. In some examples, this arrangement may minimize or prevent splashing of the fluid agents during their application, which in turn leads to a cleaner appearance and more precise, accurate distribution of the fluid agents to targeted portions (e.g. voxels, groups of voxels, etc.) of the 3D object under formation. In addition, in some examples, sufficient stickiness of the build material may ensure that the particles of the build material do not become dislodged upon receiving impact of droplets of fluid agent being applied via fluid applicator 56.

As further shown in stage C in FIG. 5 (e.g. Frame I in FIG. 4), after heating the build material in the first temperature range (Stage B) the first forward printing pass (FFPP) further comprises the fluid applicator 56 applying a portion 225A of a first total volume of a first fluid agent 226 (e.g. blackened droplets) onto first portion 1 (e.g. 72 in FIG. 1) of 3D object under formation and applies a second total volume of a second fluid agent 227 (e.g. white droplets) onto the second portion 2 (e.g. 74 in FIG. 1) of the 3D object under formation. In some instances, both of the first fluid agent 226 and second fluid agent 227 comprise a fusing agent 95 while solely the first fluid agent 226 comprises a material property modifier agent 98. Accordingly, in some such examples, the second fluid agent 227 applied to the second portion 74 of the 3D object under formation does not include the material property modifier agent 98.

By including a fusing agent 95 in both the first fluid agent 226 and the second fluid agent 227, upon exposure to radiation energy, both the first and second portions (e.g. 72, 74 in FIG. 1) can exceed a melt temperature of the build material such that at least some fusing may occur at those respective first and second portions. For instance, the fusing agent 95 may be applied in the portion 225A of first fluid agent 226 and which is represented in Table 1 as AFA in Channel 7. As further shown in Table 1, for the first portion 72 the fusing agent 95 is applied at a Contone Level 130.

However, it will be understood that the fusing agent 95 is not applied to non-targeted portions 230 of layer 214 of build material, which therefore can remain in a different temperature range below the melting point of the build material. This arrangement helps to ensure that the non-targeted build material does not become adhered to the 3D object under formation and/or may be disposed of without undue effort at conclusion of formation of 3D object.

For instance, the fusing agent 95 may be applied in the portion 225A of first fluid agent 226 via fluid applicator 56 (FIGS. 1, 3A, 4) and which is represented in Table 1 as AFA in Channel 7.

The first fluid agent 226 also may comprise a material property modifier agent 98, which is represented in Table 1 as "Modifier" in Channels 4 and 5. As further shown in Table 1, the material property modifier agent 98 may be applied (to first portion 72) at 255 Contone Level, which is the maximum rate of application for a channel during a printing pass. Moreover, to increase application of the total volume of material property modifier agent 98 in a given set of printing passes for a first portion (e.g. 72), multiple channels of fluid applicator 56 may apply the agent 98. Accordingly, in some examples as shown in Table 1, two channels (4 and 5) are set to apply material property modifier agent 98 in a given set of printing passes.

In some examples, a greater or fewer number of channels may be used to apply the material property modifier agent 98 to a first portion 72 of the 3D object under formation. In this example, a total volume of first fluid agent 226 may correspond to two channels of material property modifier agent 98 at 255 Contone Level, one channel of fusing agent 95 at 130 Contone Level (and minor volume of 15 CL of Cyan-Channel 2).

While not shown in Table 1, for the second portion 74 of the 3D object, the fusing agent 95 (AFA in Channel 7) is applied at a Contone level (CL) of 40. This volume would correspond to the second total volume of second fluid agents 227 applied at second portion 74, as shown in Stage C in FIG. 5.

Accordingly, it can be seen that in at least some examples, the first fluid agent 226 may be applied to first portion 72 (FIG. 1) at a volume (e.g. 640-655 Contone Level) which is substantially greater than a volume (e.g. 40-55 Contone Level) at which second fluid agent 227 is applied to second portion 74 (FIG. 1).

In one aspect, the plurality of printing passes are used to increase the amount of material property modifier agent 98 that is applied to a single layer 214 of build material and/or to distribute larger volumes of fluid agents over a greater period of time to reduce their thermal impact per unit of time. In some examples, by using a plurality of heating events (instead of a single heating event) spread over multiple printing passes, the device 20 may counteract a cooling effect that may be brought on by the large amount of applied first fluid agent 226 (including material property modifier agent 98 and fusing agent 95). Among other effects, the plurality of heating events may facilitate evaporation of liquid on a layer of build material that accumulates due to the large volume of applied material property modifier agent 98.

As further shown in Stage D in FIG. 5 (D in FIG. 4), during a first forward printing pass (FFPP) a second radiation source 158B applies radiation 220 on the first portion 72 and second portion 74 to achieve an elevated temperature range in portions 72, 74 to initiate fusing at those portions and to evaporate volatiles. In one aspect, this selectable temperature range also may prevent recrystallization of the uppermost layer of build material, which in turn may minimize or prevent warping. This at least partial fusing action is represented by blackened elements 232A for first portion 72 and by shaded elements 234 for second portion 74. In some examples, a lower limit of the temperature range for the first and second portions 72, 74 exceeds a melting temperature of the build material while an upper limit of the temperature range avoids over-melting (in which surrounding non-targeted portions of the build material could otherwise become adhered to the 3D object under formation). Meanwhile, radiation from the second radiation source 158B is exposed to the first and second portion 72, 74 immediately after the application of the fluid agents 226, 227 with such radiation continuing at least until the printing assembly 120 completes the first forward printing pass (FFPP).

As further shown in stage E of FIG. 5, after the first forward printing pass (FFPP) but before a first rearward printing pass (FRPP) (e.g. stage F in FIG. 5), movement of the printing assembly 120 (and operation of the applicator 56 and the radiation sources 158A, 158B) may be suspended. In some instances, this suspension period may sometimes be referred to as a delay or a wait period as represented in Stage E of FIG. 5 as "WAIT". In one aspect, during this delay, the extra time is used to let the non-target portions 230 of build material cool so as to stay below its melting temperature and/or to allow heat in fused portions (e.g. 234, 232A) to conduct in a vertical (e.g. z axis) direction into the layers 202 below, such as represented via fused portion 204 in FIG. 5, Stage E. This delay also enables evaporation of volatiles resulting from application of at least the first fluid agent 226. In some examples, the delay period or suspension period may sometimes be referred to as a period of passive cooling.

The wait time (e.g. suspension period) is selected to allow some cooling and/or facilitate evaporation of fluids after the first forward printing pass (FFPP) but to avoid re-crystallization of the at least partially fused build material in first and second portions 72, 74 of the 3D object under formation. As previously noted, by avoiding such re-crystallization, warping may be minimized or prevented. In some examples, the suspension period may be one to four seconds.

However, it will be understood that an upper limit of the selectable time period of suspension corresponds to the temperature of the first and second portions not dropping below a recrystallization temperature of the build material.

In addition, one aspect of the suspension of movement depicted in Stage E in FIG. 5 includes a cessation of the application of fluid agents and/or the absence of an abrupt reversal of motion of the carriage 130 of printing assembly 120 (FIG. 3-4). This arrangement may minimize or eliminate backlash, which might otherwise take place if a continuous motion from the first forward pass into the first rearward pass were implemented. Accordingly, a higher image quality may be achieved Prior to describing details of the first rearward pass portion (FRPP) represented via frame II in FIG. 4 and stage F in FIG. 5, it will be noted that in some examples the manufacture of the 3D object involves applying fluid agents solely in a forward pass. In other words, in such examples no fluid agents (or any fluids) are applied onto the 3D object under formation during a rearward pass of the printing assembly 120. Accordingly, in one aspect, the suspension in movement of printing assembly 120 may ease omitting application of fluid agents in the first rearward printing pass (FRPP).

However, some example implementations may include fluid application in the first rearward printing pass (FRPP) while still achieving a substantially uniform thermal profile of the first and second portions 72, 74 of the 3D object (despite substantially different fluid volumes being applied to the respective first and second portions 72, 74) provided that appropriate adjustments are made in the volume of fluid applied, speed of the carriage 130, volume and timing of radiation, etc.

As shown in Stage F in FIG. 5 (see frame II in FIG. 4), a first rearward printing pass (FRPP) is made in which the printing assembly 120 travels without applying fluid agents (via applicator 56) and while applying radiation via a first radiation source 158A of the carriage assembly. In some examples, this stage F may be performed without applying radiation via the second radiation source (e.g. 158B). In this first rearward printing pass (FRPP), the first and second portions 72, 74 of the 3D object 70 under formation are maintained above the melting temperature of the build material but below an over-melting temperature, in a manner previously noted in the first forward printing pass (FFPP). In some examples in which the melt temperature for a particular build material is 175° C., this temperature range may be between 180° C. to 220° C. By activating solely the first radiation source 158A, the volume of radiant heat is purposefully limited to help maintain the first and second portions 72, 74 of the 3D object (under formation) within the above-noted selectable temperature range. In addition, the use of the first radiation source 158A may provide more time for some portions of the 3D object under formation to cool prior to receiving further radiation (after radiation from the first forward printing pass). However, in some examples, the first rearward printing pass (FRPP) in Stage F may also involve use of the second radiation source 158B.

As shown as Stages G, H, and I of FIG. 5 (frame III in FIG. 4), in some examples a second forward printing pass (SFPP) may be performed. During this pass, as shown via Stage G, radiation is applied via the radiation source (e.g. first radiation source 158A), followed by application (via applicator 56) of a second portion 225B of the first total volume of the first fluid agent 226 to the first portion 72 of 3D object, as represented by Stage H in FIG. 5. In addition, during this second forward printing pass (SFPP), radiation may be applied via the radiation source (e.g. second radiation source 158B in FIG. 3A) immediately following application of portion 225B of first fluid agent 226, as represented per Stage I. In one aspect, this second forward printing pass (SFPP) is used to apply the remaining balance (e.g. 225B) of the total volume of the first fluid agent 226, thereby avoiding an attempt of a single-pass application of the relatively high volume of the fluids (first fluid agent 226) involved in applying the material modifier agent 98 and associated fusing agent 95. By doing so, one can more readily maintain the first and second portions 72, 74 of 3D object 70 within a substantially uniform temperature range during their formation, and thereby avoiding at least some of the previously-noted undesirable effects (e.g. layer or part warpage, lack of uniformity in fusing, dimensional inaccuracies, undesired mechanical performance, poor finish quality, etc.)

In some examples, the application of first and second radiation sources 158A, 158B as represented per Stages G and I, respectively, may be implemented to induce fusing of the build material while incorporating and/or otherwise activating the material property modifier agent 98. In addition, such radiation and attending heating may help evaporate fluids from a surface of the 3D object under formation.

In some examples, during the second forward printing pass (SFPP) the control portion 60 controls the speed of the carriage 130, the relative volume of the applied fluid, the volume of the radiation, etc. to maintain the temperature of the first and second portions 72, 74 within the same general above-described range between a melt temperature and an over-melting temperature of the build material. In one aspect, by maintaining the first and second portions 72, 74 in this temperature range, further fusing and formation of the first and second portions 72, 74 may occur while avoiding warping.

In some examples, the second forward printing pass (SFPP) may be performed without applying any second fluid agent 227 to the second portion 2 (e.g. 74) of the 3D object, at least because all the appropriate fusing agent and/or other agents of the second fluid agent 227 were applied in the first forward printing pass (FFPP). In some examples, this second forward printing pass (SFPP) is performed without distributing any new build material prior to the second forward printing pass.

In some examples, at least some of the second portion 225B of first fluid agent 226 and attendant radiation via radiation source 158A may be applied during the first rearward printing pass (FRPP) previously described per Stage F in FIG. 5 and Frame II of FIG. 4, provided that the parameters (e.g. carriage speed, radiation exposure, relative fluid volume applied, etc.) are controlled to maintain the first and second portions 72, 74 within the above-described temperature range between the melting temperature and the over-melting temperature of the build material.

As shown via Stage J in FIG. 5 and frame IV of FIG. 4, in some examples, a second rearward printing pass (SRPP) may be performed. In this pass, radiation may be applied via the radiation source (e.g. first radiation source 158A) to cause final fusing of the first and second portions 72, 74 without any further application of the first fluid agent 226. As previously noted, no second fluid agent 227 is applied in this pass.

In some examples, this second rearward printing pass (SRPP) may be performed without applying radiation via second radiation source 158B. Stated differently, in this pass radiation may be applied solely via the first radiation source 158A. As in the prior printing passes, during the second rearward printing pass (SRPP) the first and second portions 72, 74 are maintained within the above-described temperature range between the melting temperature and the over-melting temperature of the build material. By doing so, further fusing and formation of the first and second portions 72, 74 may occur while achieving at least some fusing uniformity, desirable surface finish quality and while minimizing or preventing warping.

As shown in Stage K of FIG. 5, following the second rearward printing pass (SRPP) a 3D object 260 has been at least partially formed and in which different material properties will be exhibited for the respectively different portions 1 and 2 (corresponding to portions 72 and 74 in FIG. 1) because of the application of the material property modifier agent to the first portion 72 (but not to second portion 74).

As shown in Stage L of FIG. 5, in some examples, an additional layer of build material is distributed as layer 210 via build material distributor 50 in a manner similar to Stage A. In some examples, this addition of build material in Stage L may quench the molten part layer below, create interlay integrity, and/or reduce thermal bleeding. In some examples, the addition of build material in Stage L corresponds to beginning of next layer of several layers of a 3D object under formation. In some examples, addition of build material as shown in Stage L may be the final layer of a fully formed 3D object.

FIG. 6 is a block diagram schematically representing an example control portion 460. In some examples, control portion 460 provides one example implementation of the control portion 60 (FIG. 1) and/or a control portion forming a part of, implementing, and/or managing any one of the devices, components, material distributors, printing assemblies, fluid supply, fluid applicators, radiation sources, instructions, engines, functions, parameters, and/or methods, as described throughout examples of the present disclosure in association with FIGS. 1-5 and 7-9.

In some examples, control portion 460 includes a controller 462 and a memory 470. In general terms, controller 462 of control portion 460 comprises at least one processor 464 and associated memories. The controller 462 is electrically couplable to, and in communication with, memory 470 to generate control signals to direct operation of at least some the devices, components, material distributors, printing assembly, fluid supply, fluid applicators, radiation sources, instructions, engines, functions, parameters, and/or methods, as described throughout examples of the present disclosure. In some examples, these generated control signals include, but are not limited to, employing instructions 471 stored in memory 470 to at least direct and manage additive manufacturing of 3D objects in the manner described in at least some examples of the present disclosure. In some examples, at least some instructions 471 are implemented via manufacturing engine 500 in FIG. 8.

In response to or based upon commands received via a user interface (e.g. user interface 480 in FIG. 7) and/or via machine readable instructions, controller 462 generates control signals to implement additive manufacturing of a 3D object in accordance with at least some of the examples of the present disclosure. In some examples, controller 462 is embodied in a general purpose computing device while in some examples, controller 462 is incorporated into or associated with at least some of the devices, components, material distributors, printing assembly, fluid supply, fluid applicators, radiation sources, instructions, engines, functions, parameters, and/or methods, etc. as described throughout examples of the present disclosure.

For purposes of this application, in reference to the controller 462, the term "processor" shall mean a presently developed or future developed processor (or processing resources) that executes sequences of machine readable instructions contained in a memory. In some examples, execution of the sequences of machine readable instructions, such as those provided via memory 470 of control portion 460 cause the processor to perform actions, such as operating controller 462 to implement additive manufacturing of 3D objects as generally described in (or consistent with) at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium), as represented by memory 470. In some examples, memory 470 comprises a computer readable tangible medium providing non-volatile storage of the machine readable instructions executable by a process of controller 462. In other examples, hard wired circuitry may be used in place of or in combination with machine readable instructions to implement the functions described. For example, controller 462 may be embodied as part of at least one application-specific integrated circuit (ASIC). In at least some examples, the controller 462 is not limited to any specific combination of hardware circuitry and machine readable instructions, nor limited to any particular source for the machine readable instructions executed by the controller 462.

Figure 9:
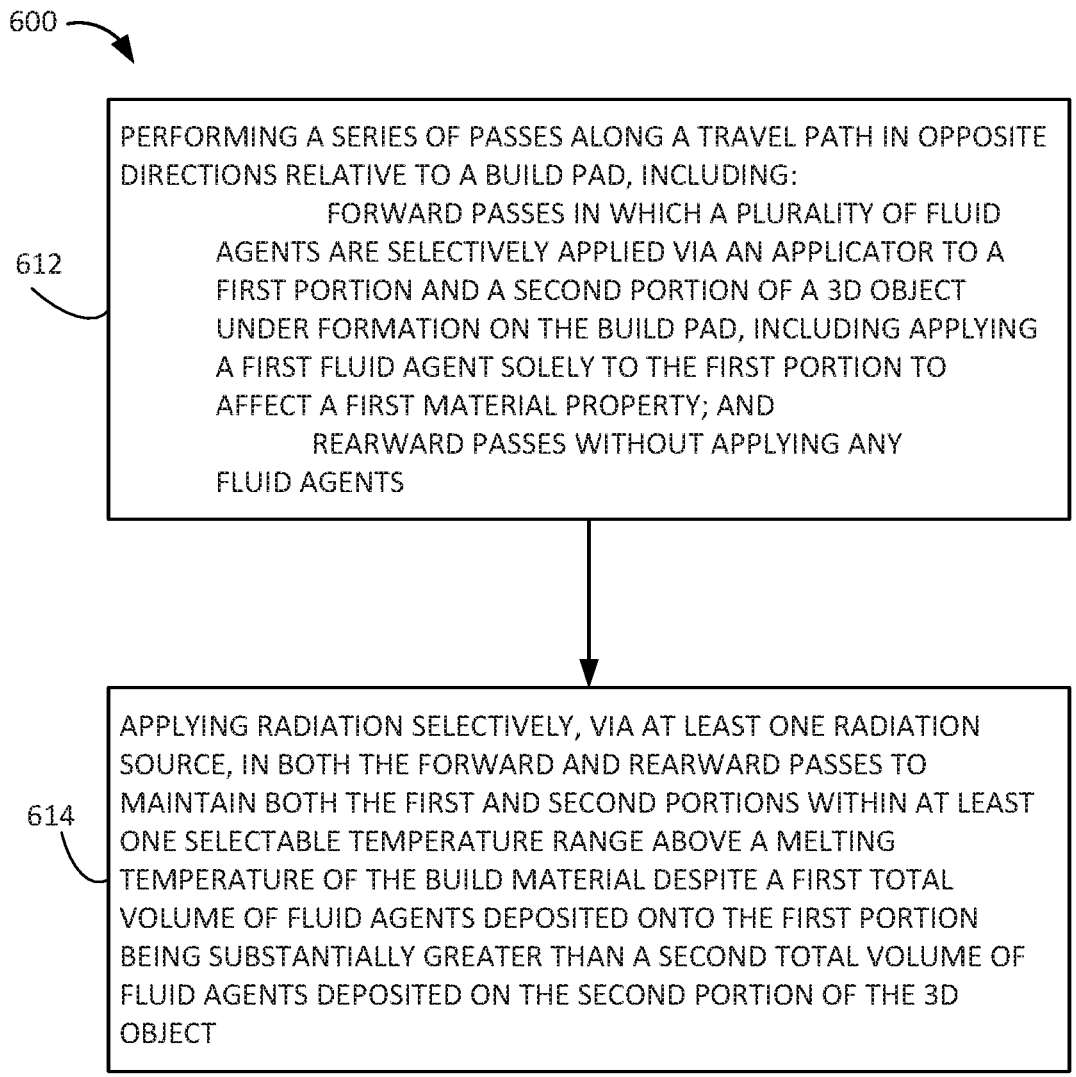
FIG. 9 is a flow diagram schematically representing an example method of manufacturing a 3D object.

In some examples, control portion 460 may be entirely implemented within or by a stand-alone device, which has at least some of substantially the same features and attributes as device 20 as previously described in association with at least FIGS. 1-5 and at least FIGS. 7-9. In some examples, the control portion 460 may be partially implemented in the device 20 and partially implemented in a computing resource separate from, and independent of, the device 20 but in communication with the device 20.

In some examples, control portion 460 includes, and/or is in communication with, a user interface 480 as shown in FIG. 7. In some examples, user interface 480 comprises a user interface or other display that provides for the simultaneous display, activation, and/or operation of at least some of the devices, components, material distributors, printing assembly, fluid supply, fluid applicators, radiation sources, instructions, engines, functions, parameters, and/or methods, etc. as described in association with FIGS. 1-5 and 8-9. In some examples, at least some portions or aspects of the user interface 480 are provided via a graphical user interface (GUI), and may comprise a display 484 and input 482.

FIG. 8 is a block diagram schematically representing an example manufacturing engine 500. In some examples, the manufacturing engine 500 directs and manages additive manufacturing of a 3D object, including layering build materials, applying fluid agents, and/or applying radiation relative to a receiving surface to additively form a three-dimensional (3D) object. In some examples, manufacturing engine 500 provides at least some example implementations of instructions 471 in memory 470 associated with control portion 460 (FIG. 6).

In some examples, manufacturing engine 500 provides one example by which at least some examples described in association with at least FIGS. 1-7 and 9 may be implemented.

As shown in FIG. 8, in some examples manufacturing engine 500 comprises a material distributor engine 510, carriage engine 516, fluid applicator engine 520, radiation source engine 530, operations engine 540, temperature control engine 550, material property engine 560, and composition engine 580.

As shown in FIG. 8, in some examples the material distributor engine 510 controls distribution of layers of build material relative to build pad (e.g. 42 in FIG. 1) and/or previously deposited layers of build material.

In some examples, the material distributor engine 510 comprises a material parameter 512 to specify which material(s) and the quantity of such material which can be used to additively form a body of the 3D object. In some examples, these materials are deposited via build material distributor 50 of device 20 (FIG. 1).

In some examples, the material controlled via material parameter 512 of material distributor engine 510 may comprise polymers, ceramics, etc. having sufficient strength, formability, toughness, etc. for the intended use of the 3D object with at least some example materials being previously described in association with at least FIG. 1.

In some examples, manufacturing engine 500 comprises a carriage engine 516 to control the operations of a carriage (e.g. 30 in FIG. 1; 130 in FIG. 3A) in association with at least operations engine 540 as further described below and/or as described in association with at least FIGS. 1-7 and 9.

As shown in FIG. 8, in some examples the fluid applicator engine 520 may specify which fluid agents are to be selectively deposited onto a layer of build material. In some examples, such agents are deposited via fluid applicator 56 (FIG. 1). In some examples, the fluid applicator engine 520 may comprise a carrier function 522 and an agent function 524 to apply fluid agents, such as the carrier, fusing, detailing, color, and material property modifier agents 92, 95, 96, 97, 98 as previously described in association with at least FIG. 2.

In some examples, fluid applicator engine 520 operates via features and attributes as exhibited per at least Table 1 (and FIGS. 4-5), such as specifying a number of fluid application channels, volume of fluid to be applied, during which pass the particular fluid channel is active, etc.

In some examples, manufacturing engine 500 comprises a radiation source engine 530 to control operations (in coordination with operations engine 540) of at least one radiation source (e.g. 58 in FIG. 1).

In some examples, radiation source engine 530 comprises a first radiation source function 532 to control a first radiation source (e.g. 158A in FIG. 3A), a second radiation source function 534 to control a second radiation source (e.g. 158B in FIG. 3A), and/or a general radiation function 536 to control a general radiation source (e.g. 162 in FIG. 3B). In some examples, the radiation source engine 530 may control an amount of time that energy from radiation source (e.g. 58 in FIG. 1; 158A, 158B in FIG. 2) is emitted (i.e. irradiation) toward the material, agents, etc. on a layer of build material. In some examples, the radiation source may irradiate the targeted layer (of the 3D object under formation) in a single flash or in multiple flashes. In some examples, the radiation source may remain stationary (i.e. static) or may be mobile. In either case, during such irradiation, the radiation source engine 590 controls the intensity, volume, and/or rate of irradiation.

In some examples, the manufacturing engine 500 may comprise an operations engine 540 to control the timing (parameter 542) and order (parameter 544) of operation of the printing assembly 40, 120, fluid applicator 56 and respective radiation sources 158A, 158B, as well as material distributor 50. In some examples, this control may include controlling the direction of travel of the printing assembly 40, 120.

In some examples, the manufacturing engine 500 comprises a temperature control engine 550 to help maintain the first and second portions 72, 74 of the 3D object under formation within a selectable temperature range (e.g. thermal profile) despite the substantially different volumes of fluids applied to the respective first and second portions. In some examples, the temperature control engine 550 comprises a minimum (MIN) parameter 552 and a maximum (MAX) parameter 554 to set a minimum temperature and a maximum temperature, respectively, of the selectable range (556). In one aspect, the manufacturing engine 500 may automatically adjust operations at least some of the other engines, functions, parameters etc. in order to comply with a selected temperature range 556.

In general terms, the composition engine 580 of manufacturing engine 500 enables the selection of attributes by which the selected fluid agents are deposited via fluid applicator engine 520. For instance, in some examples the composition engine 580 comprises a location parameter 581, a size parameter 582, a shape parameter 583, a quantity parameter 585, and a spacing parameter 586. The location parameter 581 can specify a location at which the various agents and/or a structural feature of the 3D object is located. For instance, the location parameter 581 can specify a location at which a particular material property is to be exhibited such an appropriate material-property-modifying agent 98 may be applied. Meanwhile, the size parameter 582 can specify a size of the area over which the particular agent may be deposited. The size can be specified as an absolute quantity or as a relative quantity, i.e. a size relative to a size or volume of the surrounding material not receiving a particular agent.

In some examples, the shape parameter 583 enables specifying a shape over which a particular agent is deposited, which can be absolute or relative to the general shape of the 3D object. In some examples, the quantity parameter 585 enables specifying a quantity of locations at which a particular agent is deposited on a layer of material. In some examples, the spacing parameter 586 enables specifying a spacing between multiple locations at which a particular agent is deposited.

As shown in FIG. 8, in some examples manufacturing engine 500 may comprise a material property engine 560 to specify which material properties on a particular portion (e.g. 72, 74 in FIG. 1) are to be modified via application fluid agents, such as material property modifier agent 98, and irradiation per radiation source 58.

In some examples, at least some portions of at least some layers of the build material may already at least partially exhibit the material property (e.g. mechanical, electrical, chemical) specified for the selected/targeted locations without, or prior to, any operation or action by the fluid applicator 56 and material property engine 560. Hence, in some examples various parameters of the materials property engine 560 may track and/or reflect such already existing material properties of the 3D object.

In some examples, material property engine 560 comprises a mechanical parameter 561, electrical parameter 570, chemical parameter 577, multi-property parameter 578, and degree parameter 579.

In some examples, the mechanical parameter 561 may comprise a structure parameter 562, strength parameter 563, a hardness parameter 564, and/or ductility parameter 568.

In some examples, the structure parameter 562 may specify that at least some portions of at least some of the formed layers exhibit a structural framework, such as defining a latticework, foam structure, etc.

At least some of these structural properties may selectively cause the build material (influenced at least by material property modifier agent 98) to exhibit mechanical, electrical and/or chemical properties which may not ordinarily considered an intrinsic material property of the particular build material forming a 3D object 70. In some examples, such structural properties may influence and/or define other properties (e.g. electrical, chemical, other mechanical properties) specifiable by the material property engine 560.

In some examples, the mechanical property parameter 561 may comprise a magnetic parameter 565, an optical parameter 566, a thermal parameter 567, and/or other parameter 569. Via such parameters, the fluid agent engine 520 may select and/or control the extent to which the first fluid agent (including a second material in some examples) exhibits various magnetic, optical, thermal, and/or properties.

It will be understood that other, different mechanical properties also may be selected and/or controlled via mechanical property parameter 561. Accordingly, parameters 562, 563, 564, 565, 566, 567, 568, 569 do not define the full range of mechanical properties which may be selected and/or controlled via mechanical property parameter 561.

In some examples, a material property of at least a portion of a 3D object may be at least partially specified and/or at least partially determined via an electrical property parameter 570. For instance, via parameter 570, the material property may comprise electrically conductive properties (571), an electrically insulative properties (572), semi-conductive properties (574), and/or other electrical properties. Such material properties may be used to form various circuitry elements within and/or on the 3D object and/or may be used to form other non-circuitry features.

In some examples, a material property of at least a portion of a 3D object may be at least partially specified and/or at least partially determined via the chemical property parameter 577. For instance, via parameter 577, the second fluid agent may control and/or comprise chemical features, such as but not limited to, corrosion, reactivity, etc.

In some examples, some of the specifiable mechanical, electrical, and/or chemical properties may influence and/or at least partially define at least some of the other respective mechanical, electrical, and/or chemical properties of the formed layers.

In some examples, a material property of at least a portion of a 3D object may be specified via a multi-property parameter 578 to select or implement multiple different properties for selectable voxel locations. In some examples, just one selectable property may be implemented for one group of voxel locations (e.g. first portion 72 in FIG. 1), with other selectable properties being implemented at other groups of voxel locations (e.g. second portion 74 in FIG. 1).

The degree parameter 579 may specify a degree to which any particular material property specified via engine 560 is exhibited in the 3D object, such that it will be understood that the presence or absence any given material property is not expressed in a strictly binary manner, in at least some examples.

It will be understood that other, different mechanical, electrical, and/or chemical properties also may be selected and/or controlled via material property engine 560. Accordingly, the specifically identified mechanical, electrical, chemical parameters 561, 570, 577 do not necessarily define the full range of material properties which may be selected and/or controlled via material property engine 560.

It will be understood that in some examples the material distributor engine 510 and fluid application engine 520 are not limited to specifying the types of materials, agents, etc. associated with parameters and engines (e.g. 512, 522, 524, 560, etc.) shown in FIG. 8, but instead may specify any type of material, agent, etc. conducive to additively manufacturing a 3D object, with such type of materials, agents, etc. depending on the size, type, shape, use, etc. of the 3D object, and depending on the particular type of method used to perform the additive manufacturing of the 3D object.

With respect to at least the various engines and functions (and their respective parameters) represented via at least blocks 510, 516, 520, 530, 540, 550, 560, 580, 590 in FIG. 8, it will be understood that in at least some examples the various engines, functions, parameters may be arranged differently (e.g. in different groupings, combinations, separated, etc.) than shown in manufacturing engine 500 of FIG. 8 while still implementing the actions, arrangements, features, attributes, etc. as previously described in association with at least FIG. 8 and/or as described throughout at least some of the examples of the present disclosure.

It will be understood that various functions and parameters of manufacturing engine 500 may be operated interdependently and/or in coordination with each other, in at least some examples.

FIG. 9 is a flow diagram schematically representing an example method 700 of manufacturing a 3D object. In some examples, method 700 may be performed via at least some of the devices, components, material distributors, printing assembly, fluid supply, fluid applicators, radiation sources, instructions, engines, functions, parameters, and/or methods, etc. as previously described in association with at least FIGS. 1-8. In some examples, method 700 may be performed via at least some of the devices, components, material distributors, printing assembly, fluid supply, fluid applicators, radiation sources, instructions, engines, functions, parameters, and/or methods, etc. other than those previously described in association with at least FIGS. 1-8.

In some examples, at 712 method 700 comprises performing a series of passes along a travel path in opposite directions relative to a build pad. Performing the series of passes includes forward passes in which a plurality of fluid agents are selectively applied via an applicator to a first portion and a second portion of a 3D object under formation on the build pad, including applying a first fluid agent solely to the first portion to affect a first material property. Performing the series of passes includes rearward passes without applying fluid agents.

As further shown at 714 in FIG. 9, in some examples method 700 comprises applying radiation selectively, via a radiation source, in both the forward and rearward passes to maintain both the first and second portions within at least one selectable temperature range above melting temperature of build material despite a first total volume of fluid agents deposited onto the first portion being substantially greater than a second total volume of fluid agents deposited on the second portion of the 3D object.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A device comprising:
a material distributor;
a carriage movable relative to a build pad along a bi-directional travel path and supporting at least:
a first radiation source and a second radiation source spaced apart from the first radiation source on the carriage along the bidirectional travel path of the carriage; and
an applicator interposed between, and spaced apart from, the respective first and second radiation sources on the carriage, the applicator to selectively apply a plurality of fluid agents, including:
first fluid agents including a material property modifier agent to affect a first material property and a radiation-responsive fusing agent; and
second fluid agents including the radiation-responsive fusing agent; and a controller configured to:
cause distribution, via the material distributor, of a layer of build material on the build pad;
time and order operation of the respective first and second radiation sources and the applicator with the carriage to maintain first and second portions of a 3D object under formation within at least one selectable temperature range, wherein the timing and order of operation includes:
the carriage making a first forward printing pass during which:
the first radiation source is to pre-heat the build material to a temperature less than a melt temperature of the build material;
the applicator is to apply a first portion of the first total volume of first fluid agents onto a first portion of 3D object under formation and to apply the second total volume of second fluid agents onto a second portion of the 3D object under formation; and
the second radiation source is to apply radiation to maintain both of the respective first and second portions, within the at least one selectable temperature range, above the melt temperature,
after completion of the first forward printing pass, suspending operation of the carriage, of the applicator, and of the respective first and second radiation sources for a selectable time period in which the temperature of the first and second portions within the at least one selectable temperature range is maintained at or above a recrystallization temperature of the build material.

2. The device of claim 1, wherein the controller is configured to perform the timing and order of operation to cause a first total volume of the first fluid agents for application onto the first portion of the 3D object to be substantially greater than a second total volume of second fluid agents for application onto the second portion of the 3D object.

3. The device of claim 1, wherein the at least one selectable temperature range comprises a lower temperature exceeding a melting temperature of the build material and an upper temperature below an over-melting temperature of the build material at which non-targeted build material may adhere to the 3D object under formation.

4. The device of claim 1, wherein the pre-heating of the build material is to include heating the build material within a first temperature range having a minimum at which at least some wetting of the build material occurs and a maximum at least 5° C. less than the melt temperature of the build material.

5. The device of claim 1, wherein the timing and order of operation include:
the application, via the second radiation source, of radiation maintain both of the respective first and second portions below a maximum temperature corresponding to an over-melting temperature of the build material.

6. A device comprising:
a carriage movable relative to a build pad along a bi-directional travel path and supporting at least:
a first radiation source and a second radiation source spaced apart from the first radiation source on the carriage along the bidirectional travel path of the carriage; and
an applicator to selectively apply a plurality of fluid agents, including:
first fluid agents including a material property modifier agent to affect a first material property and a radiation-responsive fusing agent; and second fluid agents including the radiation-responsive fusing agent, wherein the applicator is interposed between, and spaced apart from, the respective first and second radiation sources on the carriage;

a build material distributor; and a controller configured to time and order operation of the respective first and second radiation sources and the applicator with the carriage to maintain first and second portions of a 3D object under formation within at least one selectable temperature range despite a first total volume of the first fluid agents for application onto the first portion of the 3D object being substantially greater than a second total volume of second fluid agents for application onto the second portion of the 3D object, wherein the controller is configured to direct distributing a layer of build material on the build pad prior to operation of the carriage, the applicator and the respective first and second radiation sources, wherein the controller is configured to direct the carriage to make a first forward printing pass in which, prior to operation of the fluid applicator, the first radiation source is to apply radiation to heat the build material within a first temperature range having a minimum at which at least some wetting of the build material occurs and a maximum at least 5° C. less than a melt temperature of the build material, wherein the controller is configured to:

during the first forward printing pass, after heating of the build material within the first temperature range: applying via the applicator:

a first portion of the first total volume of first fluid agents onto first portion of 3D object under formation; and the second total volume of second fluid agents onto the second portion of the 3D object under formation; and applying, via the second radiation source, radiation to maintain both of the respective first and second portions within a second temperature range having a minimum temperature exceeding a melt temperature of the build material and a maximum temperature corresponding to an over-melting temperature of the build material, wherein the controller is configured to suspend, after completion of the first forward printing pass, operation of a printing assembly for a selectable time period in which the temperature of the first and second portions does not drop below a recrystallization temperature of the build material, the printing assembly including the carriage, the applicator, and the respective first and second radiation sources.

7. The device of claim 6, wherein the controller is configured to cause the carriage to make a first rearward pass without applying fluid agents via the applicator and while applying radiation via the first radiation source.

8. The device of claim 7, wherein the controller is configured to cause the timing and order of operation to include the carriage making a second forward pass during which:

via the applicator, a second portion of first total volume of the first fluid agents is applied to the first portion of 3D object; and via the first and second radiation sources, radiation is applied to both of the first and second portions, while maintaining the first and second portions within the second temperature range.

9. The device of claim 8, wherein the controller is configured to cause a second rearward pass in which:

via the first radiation source, radiation is applied to further fuse the first and second portions without applying the respective first and second fluid agents while maintaining the first and second portions within the second temperature range.

10. The device of claim 1, wherein the first material property comprises at least one of a plurality of material properties, at least some of which are mechanical properties.

11. A device comprising:

a carriage movable relative to a build pad along a bi-directional travel path and supporting at least:

a first radiation source and a second radiation source spaced apart from the first radiation source on the carriage along the bidirectional travel path of the carriage; and an applicator to selectively apply a plurality of fluid agents onto a build material on the build pad, including:

first fluid agents including a material property modifier agent to affect a first material property and a radiation-responsive fusing agent; and second fluid agents including the radiation-responsive fusing agent, wherein the applicator is interposed between, and spaced apart from, the respective first and second radiation sources on the carriage; and a controller is configured to time and order operation of the respective first and second radiation sources and the applicator with the carriage to maintain first and second portions of a 3D object under formation within at least one selectable temperature range despite a first total volume of the first fluid agents for application onto the first portion of the 3D object being at least 50 percent greater than a second total volume of second fluid agents for application onto the second portion of the 3D object, wherein each of the respective first and second radiation sources are sized and shaped to apply radiation energy to both first and second portions of 3D object, wherein the controller is configured to suspend the timing and order of operation of at least the carriage, the applicator, and the respective first and second radiation sources for a selectable time period in which the respective temperatures of the first and second portions of the 3D object under formation are maintained within the at least one selectable temperature range above a recrystallization temperature of the build material.

12. The device of claim 11, wherein the first total volume of the first fluid agents for application onto the first portion of the 3D object is at least one order of magnitude greater than a second total volume of second fluid agents for application onto the second portion of the 3D object.

13. The device of claim 2, wherein substantially greater comprises at least one order of magnitude difference.

14. The device of claim 11, wherein the at least one selectable temperature range comprises a lower temperature exceeding a melting temperature of the build material and an upper temperature below an over-melting temperature of the build material at which non-targeted build material may adhere to the 3D object under formation.

15. The device of claim 11, wherein the timing and order of operation includes causing the first radiation source to pre-heat the build material, to a temperature less than a melt temperature of the build material, prior to a first instance of the applicator applying first fluid agents to the first portion of the 3D object under formation, and
  wherein the pre-heating of the build material is within a first temperature range having a minimum at which at least some wetting of the build material occurs and a maximum at least 5° C. less than the melt temperature of the build material.

16. The device of claim 11, wherein the timing and order of operation include:
  the application, via the second radiation source, of radiation to maintain both of the respective first and second portions below a maximum temperature of the at least one selectable temperature range corresponding to an over-melting temperature of the build material.

17. The device of claim 11, comprising a build material distributor, and the controller to direct distributing a layer of the build material on the build pad prior to operation of the carriage, the applicator and the respective first and second radiation sources.

\* \* \* \* \*